(12) United States Patent
Nakamura

(10) Patent No.: US 7,291,997 B2
(45) Date of Patent: Nov. 6, 2007

(54) SERVO SYSTEM

(75) Inventor: Takamasa Nakamura, Sagamihara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 10/983,755

(22) Filed: Nov. 9, 2004

(65) Prior Publication Data

US 2005/0098397 A1    May 12, 2005

(30) Foreign Application Priority Data

Nov. 10, 2003    (JP) .............................. 2003-379790

(51) Int. Cl.
*H02P 3/14* (2006.01)
*H02P 3/18* (2006.01)
*H02P 3/24* (2006.01)

(52) U.S. Cl. ...................... 318/377; 318/560; 318/612; 318/614; 318/362; 318/366; 318/371; 318/372; 318/374; 318/375

(58) Field of Classification Search ................ 318/560, 318/612–614, 362, 366, 371–377; 310/77, 310/93, 89, DIG. 6
See application file for complete search history.

(56) References Cited

U.S. PATENT DOCUMENTS 6,291,951 B1    9/2001   Baulier

FOREIGN PATENT DOCUMENTS

| EP | 1 138 450 A2 | 10/2001 |
|---|---|---|
| GB | 1 440 334 | 6/1976 |
| JP | 2001-269884 A | 10/2001 |

*Primary Examiner*—Lincoln Donovan
*Assistant Examiner*—Erick Glass
(74) *Attorney, Agent, or Firm*—Foley & Lardner LLP

(57) ABSTRACT

A motor has built therein a brake for stopping the rotation of the motor and a brake controlling circuit for controlling the brake. The motor is further provided with a bypass circuit for supplying an electric power directly to the brake and a terminal for connecting a power source to the bypass circuit. When the brake controlling circuit develops a fault, the brake is directly released by an external power source.

3 Claims, 5 Drawing Sheets

US 7,291,997 B2

SERVO SYSTEM

BACKGROUND OF THE INVENTION

1. Field of the Invention

This invention relates to a servo system

2. Description of the Related Art

The servo system is used as for controlling the positioning of a movable part in a varying mechanical device.

FIG. 1 is a block diagram illustrating the outlines of the related servo system.

The servo system shown in FIG. 1 is composed of a servo motor 110 for actuating a machine and a driver 120 for controlling the servo motor 110. The servo system of this construction is provided with a built-in brake 112 designed to suspend the rotation of the servo motor 110 when the position of a machine being operated by the servo motor 110 is required to be retained during an interruption of the supply of electric power from a main circuit power source 151 which is an electric power source for the servo motor 110. The electric power from the main circuit power source 151 is supplied via a main circuit smoothing part 121 and a main circuit current controlling part 122 to a motor.

The brake 112 built in the servo motor 110 supplies its motion from a brake power source 153 via a brake controlling circuit 113 set up inside the driver 120. The control of the timing of the closing motion of the brake 112 is executed by a controller 123 built in the driver 120 in conformity with the instruction from a high-order controller 154 and the operating condition of the servo motor 110. The driver 120 further controls the rotation of the servo motor 110 in response to the signal from a position sensor 114 of the servo motor 110. Incidentally, the electric power to the driver 120 is supplied from a control power source 152 via a voltage converter 124 to a relevant part in the driver 120.

In the servo system of this construction, when the brake controlling circuit 113 is brought into incompetency and the brake 112 is deprived of releasability for some reason or other, a method which comprises setting up in advance a wiring for directly supplying an electric power from outside of the brake circuit to the brake 112 and releasing the brake by supplying the electric power to the brake via this wiring (refer to Unexamined Publication No. JP-A-2001-269884) is available as a means to effect forced release of the brake 112.

In recent years, in the field of the servo system, the desirability of miniaturizing the driver and integrating the driver and the motor for the sake of simplifying the configuration of the system has been voiced.

As a means to solve conveniently the defective release of the brake, the concept of incorporating a separate wiring to be connected to the brake as observed hitherto has the problem of proving unfit for the simplification of the configuration of the system, though it promises easy release of the brake.

SUMMARY OF THE INVENTION

It is an object of the present invention to provide a servo system which allows the brake to be easily released during the suspension of the supply of electric power and moreover enables its own construction to be simplified.

The servo system of this invention comprises a motor; a brake disposed in the motor and adapted to stop the rotation of the rotary shaft of the motor; a brake controlling circuit disposed in the motor and adapted to control the closing motion of the brake; and a bypass circuit detoured around the brake controlling circuit and connected directly to the brake with the object of releasing the brake.

DETAILED DESCRIPTION OF THE INVENTION

The embodiments of this invention will be described below with reference to the accompanying drawings.

(First Mode of Embodiment)

Figure 1:
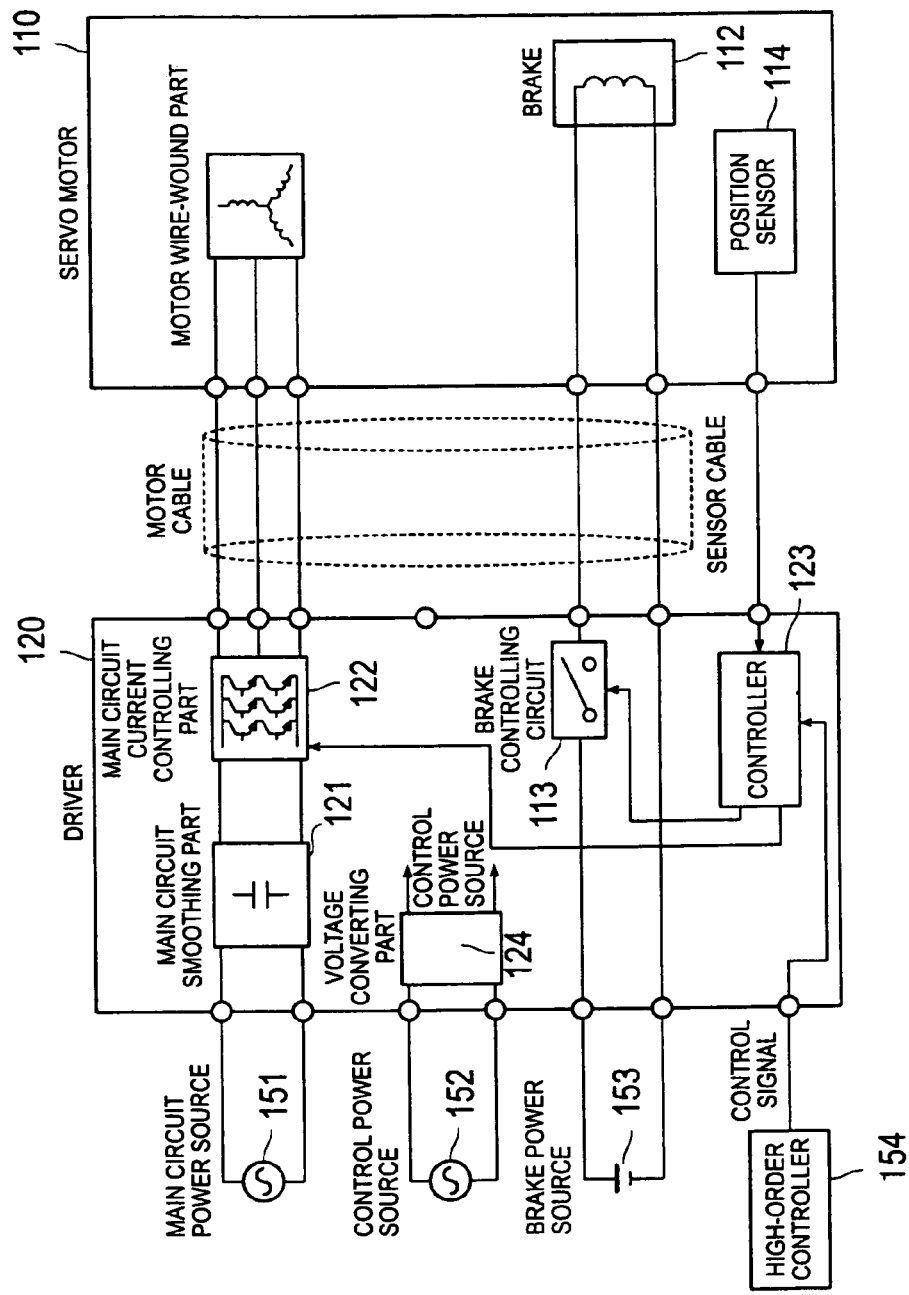
FIG. 1 is a block diagram illustrating the construction of a related servo system
Figure 2:
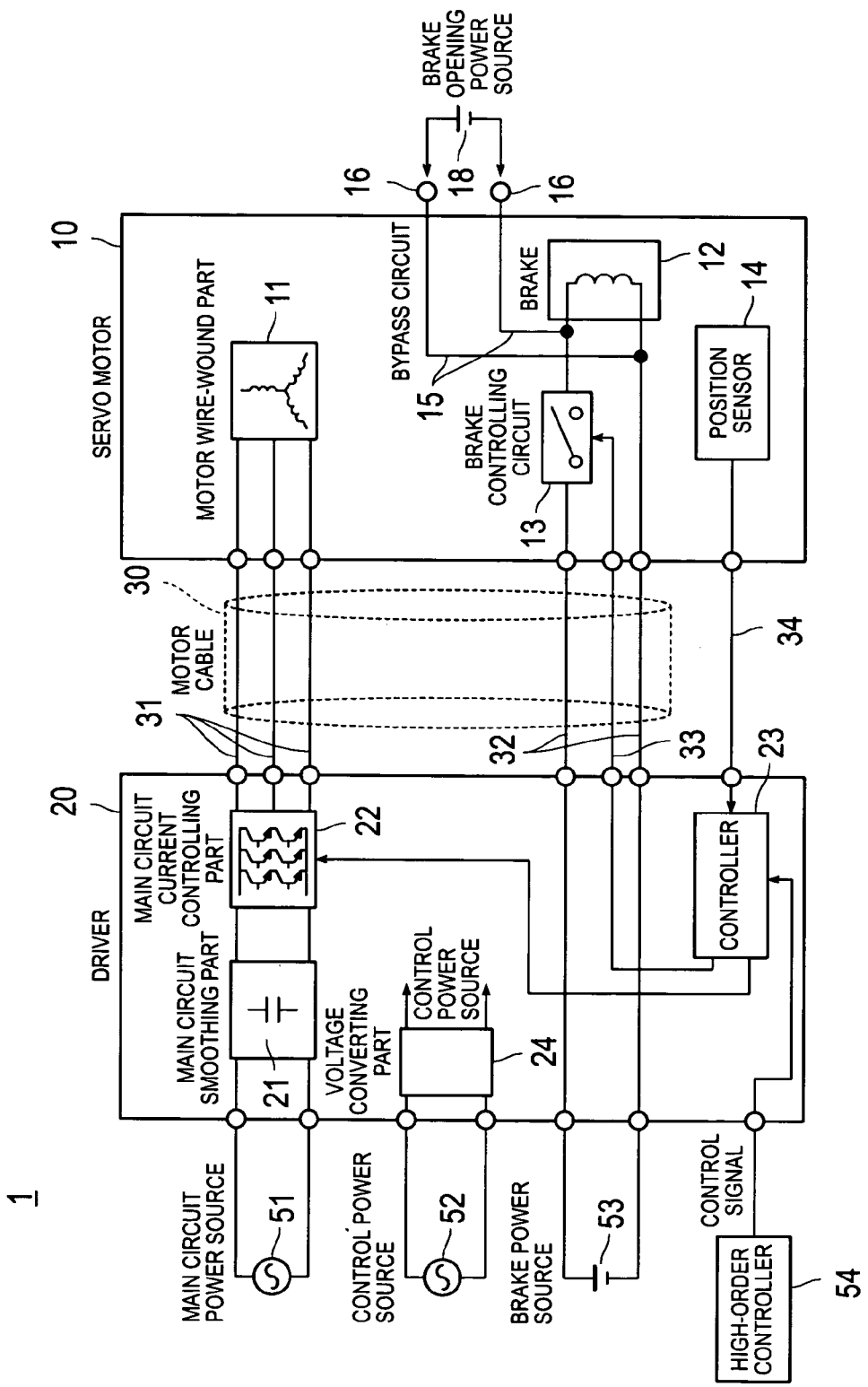
FIG. 2 is a block diagram illustrating the construction of a servo system according to the first mode of embodiment.

FIG. 2 is a block diagram illustrating the construction of a servo system according to the first mode of embodiment.

This servo system 1 is composed of a servo motor 10 serving as a drive source for actuating the movable part of a varying mechanical device and a driver 20 for controlling the servo motor 10.

The servo motor 10 has built therein a motor wire-wound part 11 to which an electric power from a main circuit power source 51 is supplied as controlled by the driver 20 and a brake 12 which serves as a braking means for suspending the rotation of the rotary shaft (not shown) of the servo motor 10 during the interruption of the supply of electric power.

The servo motor 10 has further built therein a brake controlling circuit 13 which serves as a controlling means for controlling the closing motion of the brake 12 (namely the choice between the presence and the absence of the actuation of the brake).

Here, the brake 12 is intended to suspend the rotation of the motor during the absence of the supply of the electric power for rotating the motor. This brake 12 is an unexcited actuation type electromagnetic brake, for example. This brake is such a type of a mechanism that is kept open during the presence of the supply of the electric power and kept shut during the absence of the supply of the electric power. The brake controlling circuit 13, therefore, supplies the electric power from the brake power source 53 to the brake 13 when the brake 12 is opened.

The servo motor 10 is further provided with a position sensor 14. This position sensor 14 is a rotary encoder, for example.

The servo motor 10 is provided therein with a bypass circuit 15 which is directly connected to the power source system of the brake 12.

This bypass circuit 15 is formed by causing a wiring drawn out of the electric power system of the brake 12 to be connected to a terminal 16 disposed outside the case of the servo motor 10. The brake 12 can be opened by connecting an external power source (a brake opening power source 18) to this terminal 16. This bypass circuit 15 and the brake opening power source 18, therefore, jointly serve as a means to open the brake.

The driver 20 comprises a main circuit smoothing part 21 for smoothing the electric power from the main circuit power source 51, a main circuit current controlling part 22 for varying the amount of electric current supplied to the motor, and a controller 23 for controlling this main circuit current controlling part 22. The electric power to the driver 20 is supplied from a control power source 52 to relevant parts in the driver 20 via a voltage converting part 24.

The basic operation in the servo system of this configuration is as follows. The controller 23 receives the instruction from a high-order controller 54. Here, the high-order controller 54 is intended to control the degree with which the movable part actuated by the use of the servo system is moved. The controller 23 compares the instruction from the high-order controller 54 and the signal from the position sensor 14 of the servo motor 10. The controller 23 finds the difference between the present position of the rotary shaft of the motor and the instructed position and derives the amount of rotation of the servo motor 10. Then, the controller 23 issues an instruction designating the timing for advancing the electric current to the main circuit current controlling part 22 and the amount of the electric current so advanced. Consequently, the motor is rotated till the position which is based on the instruction from the high-order controller 54.

Then, the controller 23, on instructing the main circuit current controlling part 22 to suspend the supply of electric power, issues an instruction for actuating the brake 12 on the brake controlling circuit 13. As a result, the supply of the electric power to the servo motor 10 is suspended and the motor is prevented from varying its position. The brake controlling circuit 13 closes the brake 13 and applies brake on the motor 10 by suspending the supply of the electric power to the brake in response to the instruction from the controller. The rotary shaft of the motor 10, consequently, comes to a stop when the supply of the electric power ceases to exist.

The various wires which interconnect the driver 20 and the servo motor 10 (a wire 31 from the main circuit power source part to the motor wire-wound part 11, a wire 32 from a brake power source 53 to the brake controlling circuit 13, and a wire 33 from the controller 23 to the brake controlling circuit 13) are bound together with a motor cable 30. A separate sensor cable 34 is laid to interconnect the position sensor 14 and the controller 23.

The function of the servo system in the first mode of embodiment will be described.

In this servo system, when the brake controlling circuit 13 in the servo motor 10 is brought into incompetency and the brake 12 is deprived of releasability, for example, the brake releasing power source 18 is connected to the terminal 16 of the bypass circuit 15.

Consequently, it is made possible to supply the electric power from the brake releasing power source 18 directly to the brake 13 and induce forced release of the brake 13 without requiring the use of the brake controlling circuit 13 which has been brought into incompetency.

When the brake releasing power source 18 requires to resume the former connection, it is commendable to remove the motor cable from the servo motor 10 in advance with the object of preventing the motor from producing an accidental rotation. In this case, when the motor requires to resume its rotation subsequently, the rotation of the motor is supposed to be initiated by causing the removed wire of the main circuit system to be put back to the former connection.

The present mode of embodiment further contemplates providing the motor case with the terminal 16 of the bypass circuit 15. Alternatively, the cable of the bypass circuit 15 may be drawn out together with the motor cable. By so doing, it is made possible to effect forced release of the brake from the neighborhood of the driver 20 even when the servo motor 10 and the driver 20 are located at separated positions. Naturally, this setup poses no problem on the control of the rotation of the motor. This statement does not apply where the supply of the electric power itself from the main circuit posr source has been suspended.

Thus, in the present mode of embodiment, the driver 20 is enabled to attain simplification in construction and reduction in size and weight by disposing the brake controlling circuit 13 in the servo motor 10 and integrating them. Further, since the brake 12 is provided with the bypass circuit 15 for supplying the electric power directly to the brake 12 without making a passage through the brake controlling circuit 13, the brake 12 can be readily opened even when the brake controlling circuit 13 develops a fault and prevents the brake 12 from being opened.

Further, the wire of the bypass circuit 15 is either connected to the terminal 16 disposed outside the motor case or drawn out of the case together with the motor cable. As a result, the brake releasing power source 18 can be readily connected to this bypass circuit 15.

(Second Mode of Embodiment)

Figure 3:
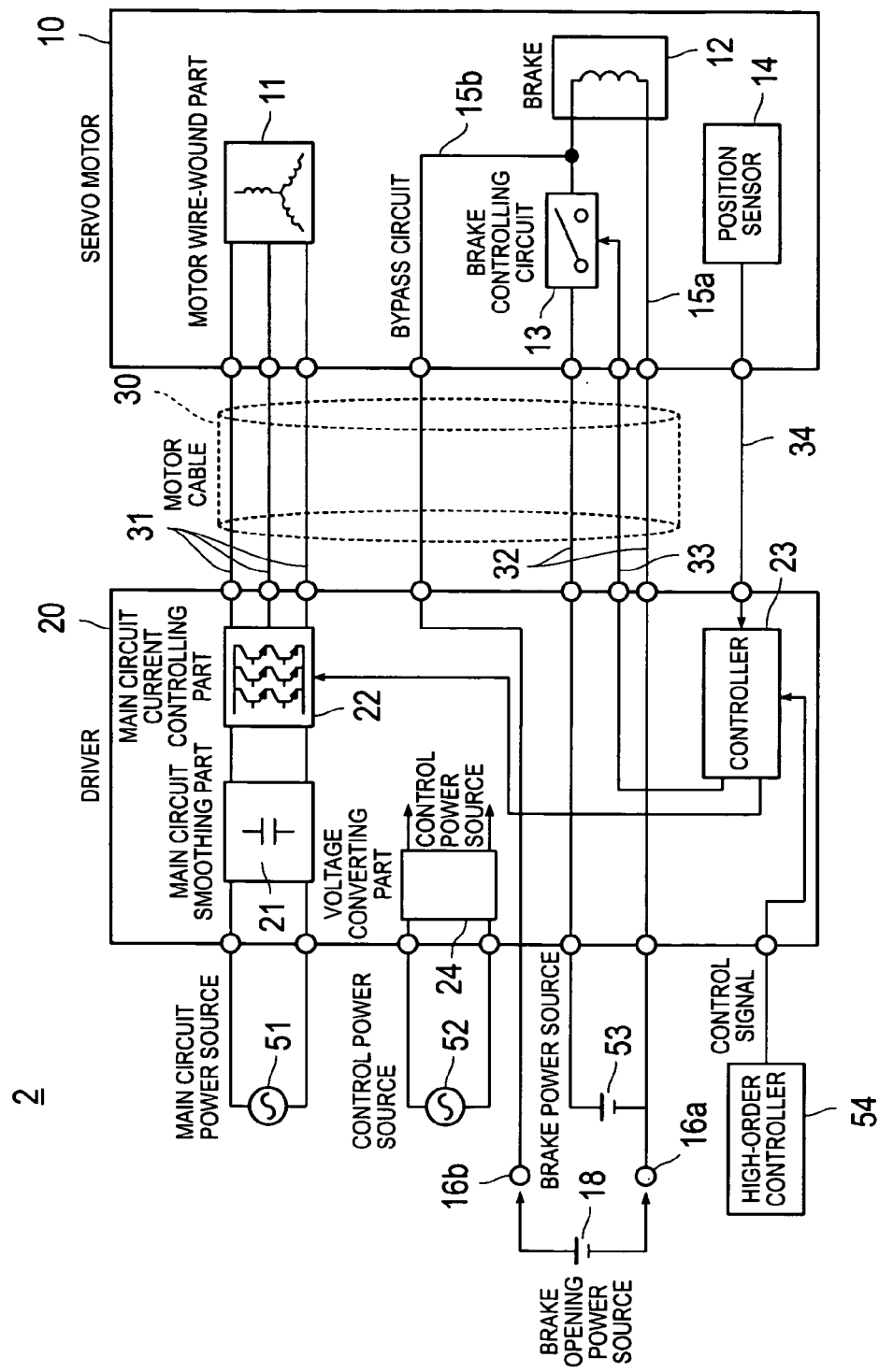
FIG. 3 is a block diagram illustrating the construction of a servo system according to the second mode of embodiment.

FIG. 3 is a block diagram illustrating the construction of a servo system according to the second mode of embodiment.

This servo system 2 utilizes one 15a of the two wires forming the wiring of the bypass circuit 15 directly connected to the brake 12 in an unmodified form as a wire 15b for connecting the ordinary brake power source 53 and the brake 12 and draws the remaining wire alone for a separate wiring.

The brake power source 53 sharing a common function with a wire 15a which forms the bypass circuit 15, therefore, is provided in advance with a terminal 16a adapted to permit the brake opening power source 18 to be connected thereto from outside.

The other wire 15b remains in independence. From the power source system of the brake 12, therefore, the wire 15b is drawn out through the motor cable till the neighborhood of a terminal 16b.

The rest of the construction and the basic operation as a servo system are identical with those of the first mode of embodiment described above and, therefore, will be omitted from the following description.

The function of the servo system in the second mode of embodiment will be described.

The present servo system as well acquires the same effect as that of the first mode of embodiment described above. The brake opening power source 18 is connected from outside to the terminals 16a and 16b of the bypass circuit 15 when the brake controlling circuit 13 is brought into incompetency and the brake 12 is deprived of releasability. As a result, the electric power can be supplied from the brake opening power source 18 directly to the brake 12 without using a passage through the brake controlling circuit 13 which has fallen into incompetency so as to effect forced opening of the brake 12.

Incidentally, in the case of connecting the brake opening power source 18, it is commendable to have the wire 31 from the main circuit power source part of the main circuit system exclusively removed in advance from the driver side (or the servo motor side). As a result, the motor can be prevented from producing an accidental rotation. In this case, when the motor is subsequently required to start its rotation, the removed wire of the main circuit system must be put back to the former connection. Naturally, this statement does not apply where the resumed connection poses no problem on the control of the rotation of the motor, or the electric power from the main circuit power source is still suspended.

Thus, the second mode of embodiment produces the same effect as the first mode of embodiment. The construction of the driver 20 can be simplified by having the brake controlling circuit 13 disposed in the servo motor 10 so as to integrate them. Further, the number of wires for use in the bypass circuit can be decreased by having part of the wires of the bypass circuit 15 used concurrently as an ordinary brake power source line. Particularly when the wire of the bypass circuit 15 is drawn out through the motor cable, the cable to be used herein is allowed to have a fewer number of core wires than that which is used in the first mode of embodiment.

(Third Mode of Embodiment)

Figure 4:
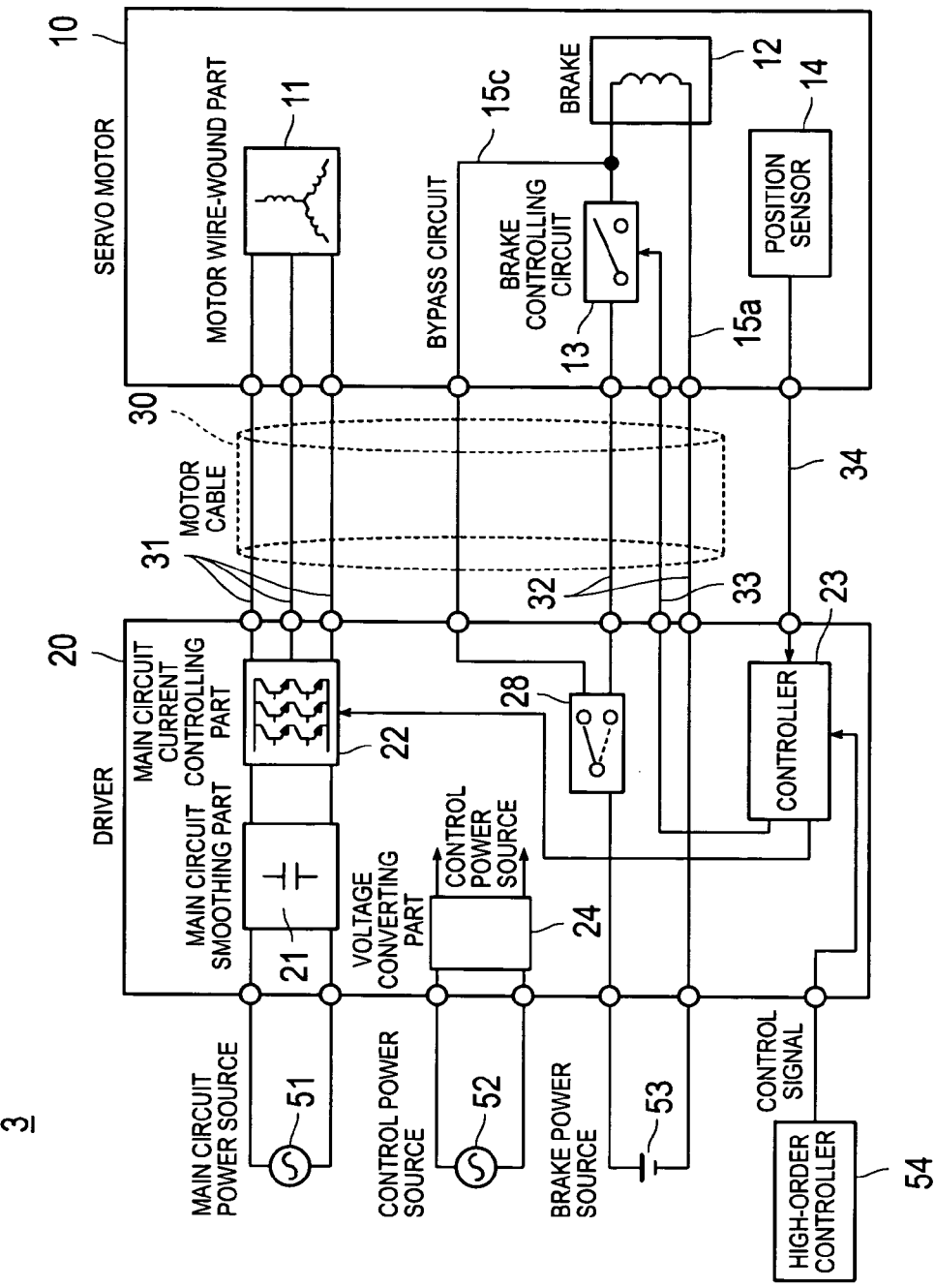
FIG. 4 is a block diagram illustrating the construction of a servo system according to the third mode of embodiment.

FIG. 4 is a block diagram illustrating the construction of a servo system according to the third mode of embodiment.

This servo system 3 uses the wire of the ordinary brake power source 53 in its unmodified form as one 15a of the two wires of the bypass circuit 15 which is directly connected to the brake 12. This servo system 3 has the remaining wire 15c drawn out as a separate wire halfway along the whole route and connected to the switch circuit (switch means) 28 which is disposed on the wire from the ordinary brake power source 53 inside the driver 20 en route to the brake controlling means.

Here, the switch circuit 28 switches the electric power from the brake power source 53 between the direction toward the wire 32 connected to the brake controlling circuit 13 and the direction toward the wire 15c forming the bypass circuit 15. Incidentally, the terminal 16 for connecting the external power source for opening the brake is not used herein. In the present configuration, therefore, the bypass circuit 15 and a switch circuit 28 constitute a means of forced release.

The rest of the construction and the basic operation as a servo system are identical with those of the first mode of embodiment described above and, therefore, will be omitted from the following description.

The function of the servo system according to the third mode of embodiment will be described.

In this servo system, the switch circuit 28 has the switch thereof turned in the direction of supplying the electric power to the brake controlling circuit 13 during the course of the normal operation.

When the brake controlling circuit 13 is brought into incompetency and the brake 12 is deprived of releasability, the switch circuit 28 is changed over toward the direction of supplying the electric power to the wire 15c of the bypass circuit 15. As a result, the electric power from the brake power source 53 is allowed to be supplied directly to the brake without taking a passage through the brake controlling circuit 13 which has been brought into incompetency. Thus, the brake 12 can be given a forced release.

Incidentally, when the switch is changed over toward the bypass circuit 15 side, it is commendable to have only the wire 31 from the main circuit power source part of the main circuit system to the motor wire-wound part 11 removed in advance from the driver side (or the servo motor side). As a result, the motor can be prevented from producing an accidental rotation. In this case, when the motor is subsequently required to start its rotation, the wire of the main circuit system which has been removed is put back to the former connection to start the rotation of the motor. Naturally, this statement does not apply where the present mode of embodiment poses no problem on the control of the rotation of the motor, or the electric power itself from the main circuit power source is still suspended.

Thus, the third mode of embodiment produces the same effect as the first mode of embodiment. The construction of the driver 20 can be simplified by having the brake controlling circuit 13 disposed within the servo motor 10 so as to integrate them. Further, part of the wires of the bypass circuit 15 are used concurrently as the ordinary brake power source line and the rest of them are enabled by the switch circuit 28 disposed in the driver 20 to lead the electric power from the brake power source 53 in normal service to the bypass circuit 15. Thus, the brake releasing power source does not need to be prepared separately.

(Fourth Mode of Embodiment)

Figure 5:
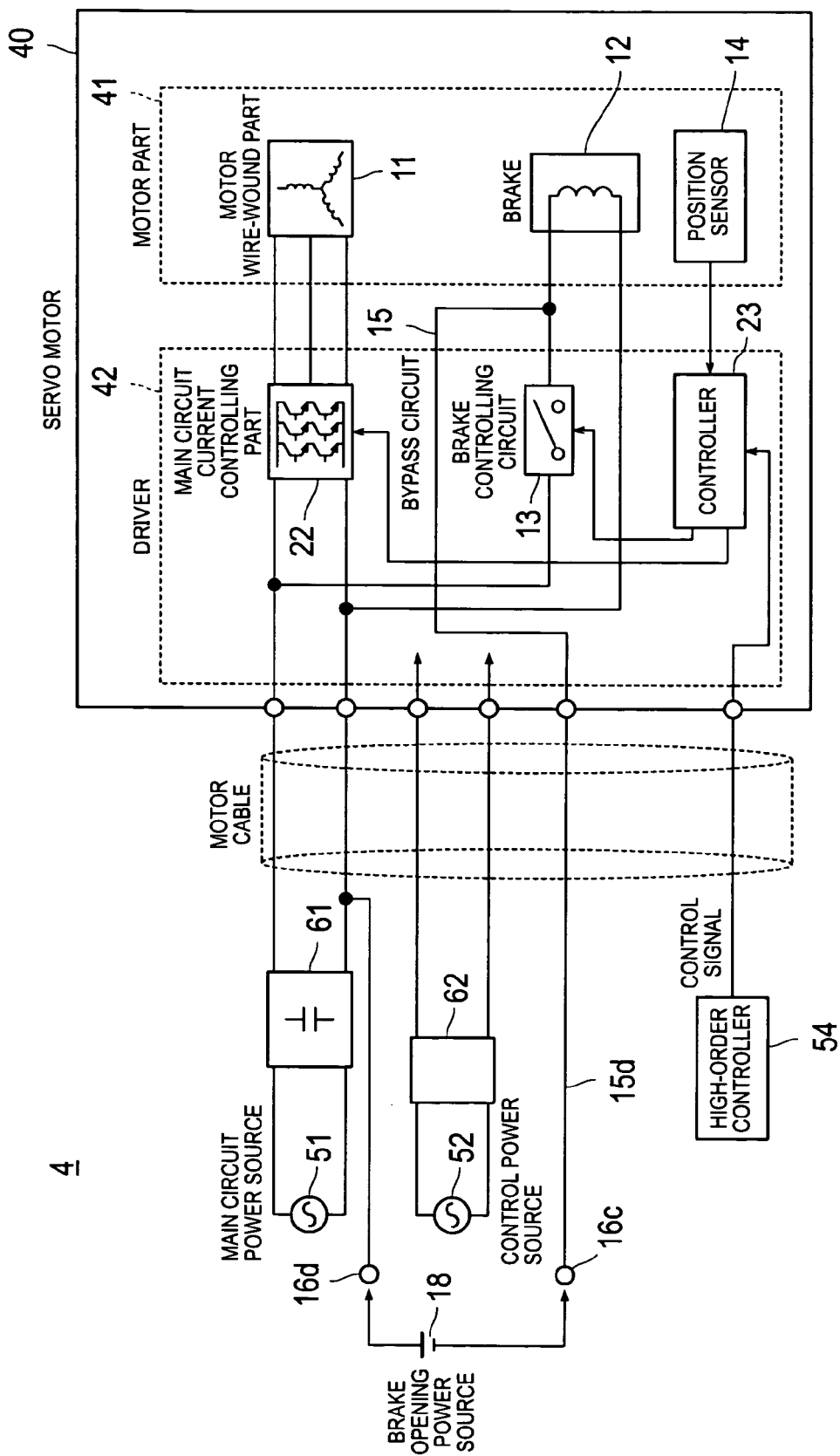
FIG. 5 is a block diagram illustrating the construction of a servo system according to the fourth mode of embodiment.

FIG. 5 is a block diagram illustrating the construction of a servo system according to the fourth mode of embodiment.

This servo system 4 has a driver built in a servo motor 40. Inside the servo motor 40, therefore, a motor part 41 and a driver part 42 are disposed. The basic construction and the basic operation of the serve system 4 are identical with those of the first mode of embodiment which has a motor and a driver constructed separately of each other.

Specifically, the motor part 41 comprises a motor wire-wound part 11, a brake 12, and a position sensor 14 and further comprises a main circuit power source controlling part 22, a controller 23, and a brake controlling circuit 13.

Here, the brake controlling circuit 13 is disposed inside the driver part 42. Alternatively, however, the brake controlling circuit 13 may be disposed inside the motor part 41. In the diagram, they are depicted as divided into respectively distinct blocks. The components which form the driver part 42 may be disposed at any positions inside the motor case and these positions do not need to be particularly restricted. These components may be disposed anywhere, even outside the motor case, so long as they maintain such states as integrated with the motor.

In the present mode of embodiment, the construction inside the driver part 42 excepting the brake controlling circuit 13 is fated to constitute a rotation controlling means.

Only one of the wires 15d for supplying the electric power to the brake 12 without using a passage through the brake controlling circuit 13 is connected to the terminal 16c which is directed outwardly.

The other wires forming the bypass circuit 15 are concurrently used as the wire for using the brake power source 53 during the course of normal service. To the wires on the side of the concurrent use, another terminal 16d intended to permit connection of the brake releasing power source 18 is connected.

The electric power necessary during the normal operation is supplied from the main circuit power source 51 via a smoothing circuit 61 which is disposed outside. The electric power from the smoothing circuit 61, therefore, is passed through the wires joined together by the motor cable 30 and supplied to the main circuit current controlling part 22 and as well advanced as the braking electric power for use during normal service to the brake controlling circuit 13 and the brake 12. Then, to the driver part 42, the electric power from the control power source 52 is supplied via a voltage converting circuit 62 which is disposed outside.

These bulks of electric power, in a factory furnished with a plurality of servo systems, may be directly supplied to the servo motor 40 through the medium of a driving electric power line or a low-voltage electric power line.

Incidentally, the basic operation in the fourth mode of embodiment is identical with that in the first mode of embodiment and, therefore, will be omitted from the following description.

The function of the servo system in the fourth mode of embodiment will be described.

The present servo system is identical with that of the first mode of embodiment. The brake releasing power source 18 is connected to the terminals 16 and 16*d* when he brake controlling circuit 13 the brake controlling circuit 13 is brought into incompetency and the brake 12 is deprived of releasability.

It is consequently made possible to supply the electric power directly to the brake from the brake releasing power source 18 without using a passage through the brake controlling circuit 13 which has been brought into incompetency to effect forced release of the brake 12.

Incidentally, when the brake releasing power source 18 requires to resume the former connection, it is commendable to have the high-order controller 54 continue issuing a stop signal with the object of preventing the motor from producing an accidental rotation.

Thus, the present mode of embodiment has the driver part 42 disposed inside the servo motor 40 as described above, the construction of the system can be simplified by having the motor and the driver integrated. Then the brake 12 can be readily released even when the brake controlling circuit 13 develops a fault and prevents the brake 12 from being opened.

Since the servo motor 10 is further provided with a rotation controlling means for controlling the rotation of the motor, it is made possible to simplify the construction of the system further and realize thorough integration of the servo motor 10 with the driver.

Incidentally, the fourth mode of embodiment most preferably has the driver part 42 built in the motor case. It does not need to be particularly restricted to the configuration having the driver part built in the motor case. For example, the driver part may be attached to the outer periphery of the motor case and integrated as a motor.

The servo system contemplated by this invention is suitable as an industrial robot, an NC (numerical control) machine tool, and a drive source (actuator) as for a conveying device, for example.

While the present invention has been particularly shown and described with reference to exemplary embodiments thereof, it will be understood by those of ordinary skill in the art that various changes in form and details may be made therein without departing from the spirit and scope of the present invention as defined by the following claims.

It is obvious that this invention is not limited to the particular embodiments shown and described above but may be variously changed and modified without departing from the technical concept of this invention.

The entire disclosure of Japanese Patent Application Nos. 2003-379790 filed on Nov. 10, 2003 including specification, claims, and summary are incorporated therein by reference in its entirety.

What is claimed is:

1. A servo system comprising:
   a motor having a case and a rotary shaft,
   a brake disposed in the case of said motor and adapted to stop the rotation of the rotary shaft of said motor,
   a brake controlling circuit disposed in the case of said motor and adapted to control the closing motion of said brake,
   a brake releasing part detouring said brake controlling circuit and directly connected to said brake for the purpose of releasing said brake, said brake releasing part further comprising a bypass circuit directly connected to said brake without an interposed power source and having at least a portion outside of the case of said motor,
   a power source, outside of the case of said motor, adapted to supply an electric power for releasing said brake, and
   a switch outside of the case of said motor, said switch coupled at a first end to the power source and coupled at a second end to the bypass circuit when in a first position so that the electric power from the power source is supplied to the brake through the bypass circuit and to the brake controlling circuit when in a second position so that the electric power from the power source is supplied to the brake directly.

2. A servo system according to claim 1, wherein said motor is further provided with a rotation controlling part for controlling the rotation of said motor.

3. A servo system according to claim 1, wherein said brake is adapted to stop the rotation of the rotary shaft of said motor in the state in which the supply of the electric power to said motor is suspended.

* * * * *